United States Patent

[11] 3,588,719

[72] Inventors Paul Abramson
Yorktown Heights;
Lawrence W. Emerson, Wappingers Falls, N.Y.
[21] Appl. No. 783,928
[22] Filed Dec. 16, 1968
[45] Patented June 28, 1971
[73] Assignee International Business Machines Corporation
Armonk, N.Y.

[54] FREQUENCY DETECTOR CIRCUIT UTILIZING AN ELECTROMECHANICAL TUNED FILTER
19 Claims, 4 Drawing Figs.

[52] U.S. Cl. .......... 329/105, 333/72
[51] Int. Cl. .......... H03k 9/00
[50] Field of Search .......... 307/233; 328/138, 140; 329/105; 330/29, 138, 144, 145; 333/70 (B), 72 (Cursory)

[56] References Cited
UNITED STATES PATENTS

| | | | |
|---|---|---|---|
| 3,260,948 | 7/1966 | Therialt .......... | 330/29X |
| 3,304,505 | 2/1967 | Pricer .......... | 330/145X |
| 3,354,413 | 11/1967 | Ko .......... | 333/72 |

*Primary Examiner*—Roy Lake
*Assistant Examiner*—Lawrence J. Dahl
*Attorneys*—Hanifin and Jancin and Joe L. Koerber

ABSTRACT: A frequency detection system for detecting the frequency of tone signal bursts is provided with a controlled damping arrangement to limit the resonant buildup of the tuned frequency device employed therein. Damping is implemented through utilization of a three terminal signal controlled variable impedance device, such as an FET device, wherein the variable impedance path is coupled in series with the input to the system and the control terminal is coupled to the output of the system.

INVENTORS
PAUL ABRAMSON
LAWRENCE W. EMERSON

BY Joe L. Koerber
ATTORNEY

FREQUENCY DETECTOR CIRCUIT UTILIZING AN ELECTROMECHANICAL TUNED FILTER

BACKGROUND OF THE INVENTION

The present invention relates to electrical signal frequency detection and more particularly to tone signal detectors employing tuned frequency selection devices such as tuning forks and the like.

A common approach to signal frequency detection is to employ some form of tuned frequency filtering device which is tuned to respond to the frequency to be detected. One of the main difficulties encountered in such systems is that the Q of the tuned device is often higher than desirable although other factors may make its use attractive or necessary. For example, in data character transmission by tone signals each different transmitter character may be represented by a different frequency tone signal, or by different combinations of different frequency parallel tone signals, and each different frequency tone signal may be detected at the receiving end by its own frequency detector. In such an arrangement it is advantageous to have a highly stable, low cost and simple tuned frequency device. Mechanically resonant tuned frequency selection devices, such as those of the tuning fork variety or the like, provide the stability, low cost and simplicity desired. However, such devices also generally exhibit a relatively high Q.

The problem with high Q tuned frequency selection devices in frequency detection systems, especially as applies to data transmission, is the characteristic slow buildup and decay time. Thus, whether the data characters are transmitted by manually keyed tones or automatically keyed tones, the rate at which the tones may be sent is limited by the response and decay times of the frequency detector at the receiving end.

SUMMARY

In accordance with the novel aspects of the present invention a frequency detection system is provided which is rapid in response notwithstanding utilization of a relatively high Q tuned frequency selection device, such as those of the mechanical variety type. More specifically, the present invention provides a frequency detection system which employs feedback-controlled automatic damping of the tuned frequency selection device to limit voltage buildup and thereby increase response time to successive signal bursts.

It is therefore an object of this invention to provide an improved frequency detection system.

It is a further object of this invention to provide a frequency detection system for rapidly detecting successive tone signal bursts.

It is yet a further object of this invention to provide a frequency detection system having an improved response time to successive bursts of tone signal.

It is yet another object of this invention to provide a frequency detection system which allows the use of high Q frequency selection devices and yet is rapid in response.

It is still yet a further object of this invention to provide a frequency detection system with a feedback-controlled damping arrangement which acts to limit voltage buildup caused by the tuned frequency device to thereby decrease response time.

The foregoing and other objects, features and advantages of the invention will be apparent from the following more particular description of a preferred embodiment of the invention, as illustrated in the accompanying drawings.

DETAILED DESCRIPTION OF THE DRAWINGS

Figure 1:
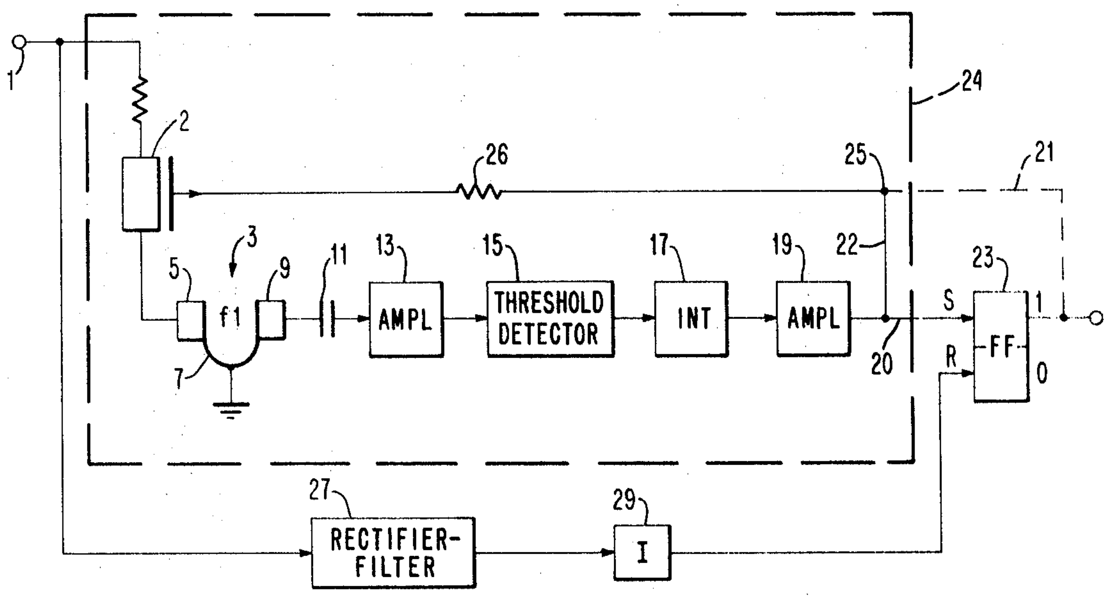
FIG. 1 shows the preferred embodiment of the frequency detection circuit in accordance with the novel aspects of the present invention.
Figure 2:
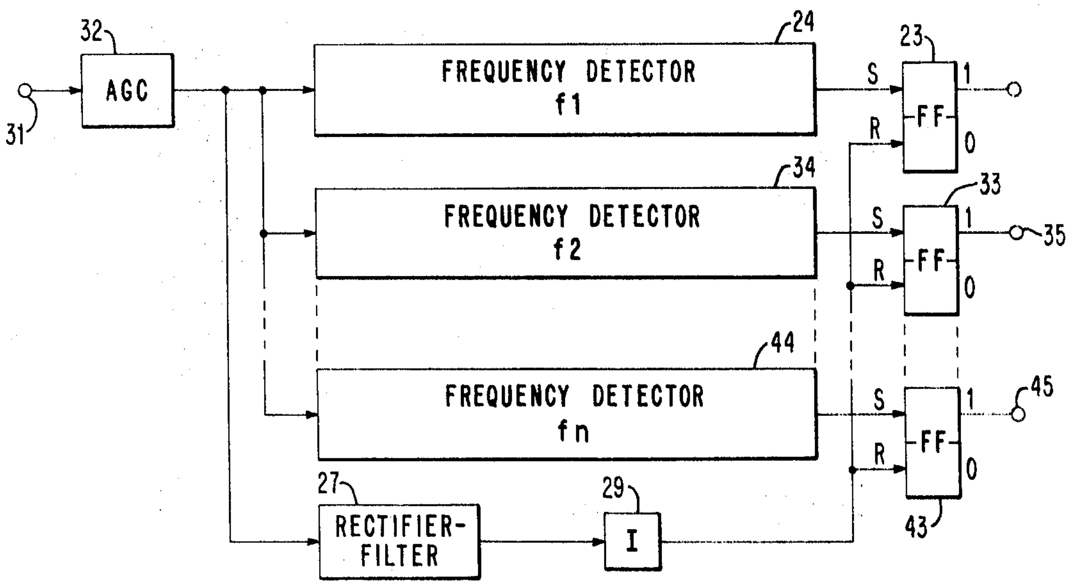
FIG. 2 shows a parallel tone detector system in which the frequency detector circuit of FIG. 1 may be employed.

The frequency detection system of FIG. 1 shows, in accordance with the preferred embodiment, an arrangement for detecting the frequency of a specific tone signal received at input terminal 1. The arrangement may be used in a parallel tone detection system as shown in FIG. 2, wherein a plurality of detectors, coupled in parallel, are each tuned to detect one of a plurality of different frequency tone signal bursts, which different frequency signal bursts respectively correspond to different transmitted data characters.

As shown in FIG. 1 the tone signal bursts are received at input terminal 1 and delivered, via Field Effect Transistor (FET) device 2, to tuned frequency device 3. Tuned frequency device 3 comprises a piezoelectric driving crystal 5 used to convert the tone signal to mechanical vibrations to drive tuning fork 7, and piezoelectric pickup crystal 9 used to pickup the mechanical vibrations of the tuning fork and convert them to electrical signals.

It is to be noted that although, in accordance with the preferred embodiment, a mechanically resonant tuning fork-type tuned frequency device has been shown, any of a variety of well known tuned frequency devices may be employed. Likewise, although an FET variable impedance device has been shown, any of a variety of well known variable impedance devices may be employed.

The output of piezoelectric pickup crystal 9 is coupled, via coupling capacitor 11, to amplifier 13. The output of amplifier 13 is coupled to threshold level detector 15 which in turn is coupled to amplifier 19 through integrator 17. The output of amplifier 19 is coupled both to the "set" input S of latching flip-flop 23, to set same, and to the control electrode of FET 2, via line 22 and resistor 26, to control attenuation of the input signal. As can be seen with reference to FIG. 1, the flip-flop 23 "reset" input R is coupled to circuit input terminal 1, via rectifier-filter 27 and inverter amplifier 29.

FIG. 2 shows the frequency detection circuit of FIG. 1 employed in a parallel tone decoder. The number of frequency detectors employed is, of course, dependent upon the number of different data characters, and therefore tones, to be transmitted. Thus, if the code used employs 16 data characters then 16 different tone sets, each set comprising its own unique combination of parallel tones are employed. To provide the 16 different tone sets, two sets of four different frequency oscillators ($A_1$, $A_2$, $A_3$, $A_4$ and $B_1$, $B_2$, $B_3$, $B_4$) may be employed. Such an arrangement would provide 16 different detectable parallel tone pair sets with one tone from each pair coming from the A frequency set and the other from the B frequency set. In such an arrangement, it is clear that 8 parallel decoders would be required wherein a different pair of the decoders would respond to each of the 16 different parallel tone sets.

Although the tone signal combinations, representing the different data characters, are received in parallel the various tone signal combinations comprising a message are serially received. Input terminal 31 of FIG. 2 receives the tone signals and delivers them, as even amplitude signals, to the frequency detector subcircuits 24, 34 and 44, via AGC circuit 32. The subcircuits 24, 34 and 44 are each the same as subcircuit 24 in FIG. 1 except they each employ a different frequency tuned frequency device, corresponding to the respective frequencies of the tone signals to be received. Thus, the various detector subcircuits operate in a manner akin to the detector circuit of FIG. 1 to detect that tone signal having a frequency corresponding to the tuned frequency of its respective tuning fork device to thereby effect an output pulse on its corresponding flip-flop output terminal. For example, a pair of parallel tone signals of frequency $f_2$ and $f_n$, received at input terminal 31, will produce an output pulse on each of the output lines 35 and 45 of flip-flops 33 and 43, respectively. It is to be noted that in the FIG. 2 system, rectifier-filter 27 and inverter 29 are shared commonly by the plurality of parallel stages.

DESCRIPTION OF OPERATION

Figure 3:
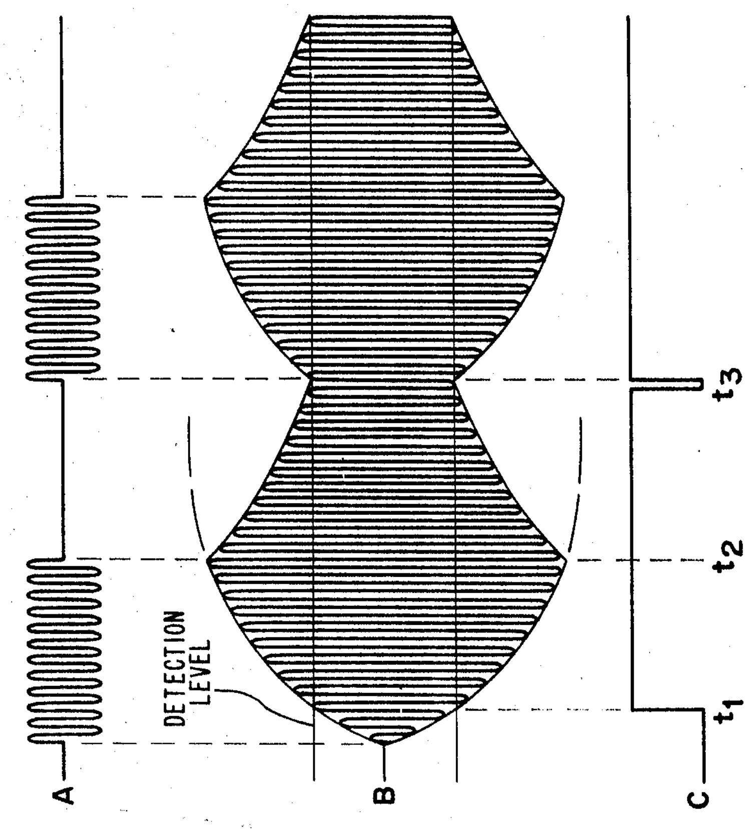
FIG. 3 shows a series of concurrent waveforms applicable to the frequency detection circuit of FIG. 1 when no feedback-controlled damping network is provided.

With reference to FIG. 1 a description of the operation will first be provided without the controlled damping effect of FET 2 in order to aid in understanding the novel features of the present invention. Accordingly, assume a tone signal burst of frequency $f_1$, as shown in FIG. 3 at A, is received directly by the input of piezoelectric driving crystal 5. The piezoelectric driving crystal 5 converts the electrical tone signal into mechanical vibrations, the frequency of which is a function of the frequency of the tone signal.

Since tuning fork 7 is tuned to the frequency of the piezoelectric crystal vibrations, resonant vibrations build up in the former. Piezoelectric pickup crystal 9 converts the resonant vibration buildup in tuning fork 7 into an electrical signal, as depicted in FIG. 3 at B. When this later signal builds up to a level corresponding to the detection level of threshold detector 15 then the detected output from the latter is coupled through integrator 17 and amplifier 19 to set flip-flop 23. The leading edge of the output pulse of flip-flop 23 is shown at $t_1$, in FIG. 3 at C.

Thus, it can be seen that when a tone signal of frequency $f_1$ is received, a binary output indication from flip-flop 23 is initiated indicating that a data character associated with the $f_1$ tone signal has been received.

As can be seen from inspection of FIG. 3, however, even after the tone signal has been detected at time $t_1$ the tone signal continues to drive the tuning fork 7 beyond the detection level and it is this additional buildup between $t_1$ to $t_2$, that creates limits on the rate at which tone signal bursts may be detected. This is evident when it is recognized that this additional buildup in the tuning fork requires a corresponding decay, from time $t_2$ to $t_3$ as shown in FIG. 3 at B. It is this slow inertial decay time that imposes practical limits on the rate at which tone signal bursts may be generated in an automatic system and the rapidity at which the tones may be keyed in a manual system. Specifically, the limiting factor exists because the frequency detection circuit is unable to unambiguously detect another tone signal burst until the level of decay in tuning fork 7 is such as to allow detector 15 to turn off. In this regard it is noted that the duration of the tone signal burst $t_1$ to $t_2$, in FIG. 3, is dependent upon the user in a manually keyed data character tone generator system and, thus, the time $t_1$ to $t_2$ cannot be controlled.

However, if actual buildup were prevented, irrespective of the duration of the tone signal burst, then no corresponding decay time would be required and the system could rapidly respond to another tone signal burst, since detector 15 would quickly turn off.

Thus, in accordance with the present invention feedback-controlled damping is provided by FET 2 in FIG. 1 to prevent buildup of tuned frequency device 3. As employed in accordance with the present invention FET 2 acts as a voltage-controlled impedance to provide a low impedance to the input tone signal burst on input terminal 1 when no output pulse exists on output line 20 of amplifier 19 and to provide a high impedance to the input tone signal burst on input terminal 1 when an output pulse does exist on output line 20 of amplifier 19. It is clear in this respect that FET 2 may operate either in an on-off switching-type mode or in a something less than on-off-type operation wherein it acts as a variable impedance.

Figure 4:
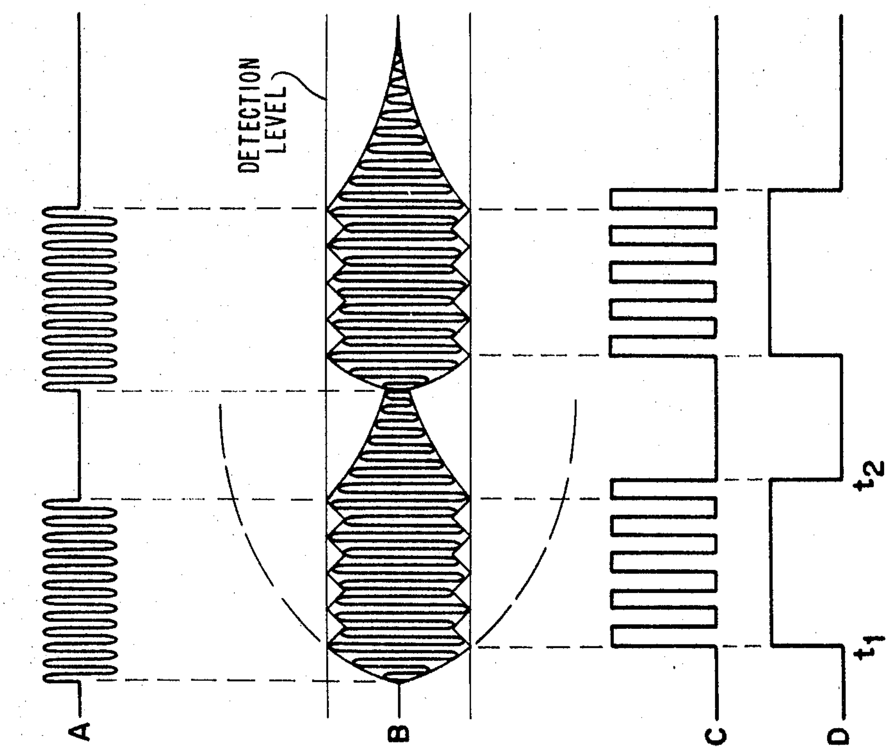
FIG. 4 shows a series of concurrent waveforms applicable to the frequency detection circuit of FIG. 1 with feedback-controlled damping, in accordance with the novel aspects of the present invention.

Accordingly, when an input tone signal burst, as shown in FIG. 4, is first received on input terminal 1 FET 2 acts as a low impedance since, at this time, the tuned device 3 has not, as yet, experienced sufficient build up to allow detection by detector 15 to thus provide an output pulse on output line 20 of amplifier 19. FET 2 remains a low impedance until the voltage buildup provided by pickup piezoelectric crystal 9 reaches detection level, as shown in FIG. 4 at B.

When detection level is reached the output from detector 15 is integrated and the leading slope of the integrated signal is steepened by overdriven amplifier 19 to provide a positive voltage level change, as shown at $t_1$ in FIG. 4 at C. This voltage level change sets flip-flop 23 and drives FET 2 into a high impedance condition.

With FET 2 in a high impedance condition the input tone signal is attenuated and tuned device 3 begins to decay, as shown by the first declination of voltage after time $t_1$ in FIG. 4 at B. Because of its hysteresis characteristics, detector 15 does not immediately turn off at the detection level shown in FIG. 4, but rather responds to turn off after a small increment of voltage decay below this level.

When detector 15 turns off, the output of amplifier 19 drops to its original quiescent level as shown by the trailing edge of the first pulse in FIG. 4 at C. This drop in voltage again effects a low impedance condition in FET 2.

As can be seen by inspection of FIG. 4 the above discussed cycle continues throughout the duration of the tone signal burst, in a hunting fashion, to maintain the tuned frequency device buildup alternately at and below detection level. Accordingly, when the received tone signal shown in FIG. 4 at A ends, detection by detector 15 rapidly terminates and the absence of a tone signal condition allows inverter 29 in FIG. 1 to reset flip-flop 23 at time $t_2$, as shown in FIG. 4 at D.

It is to be noted that although FET 2 has been described as being driven into a high impedance state by the output from amplifier 19, it is evident in this regard that the output from flip-flop 23 could likewise perform this function. Such an arrangement is depicted in FIG. 1 wherein dotted line 21 is connected to terminal 25 in place of line 22. However, unlike the hunting type operation above described, feedback control from flip-flop 23 to FET 2 causes a single decay, commencing at $t_1$ in FIG. 4. This is so because flip-flop 23 is not reset by the downward decay function and therefore remains set to provide a damping signal to FET 2 until it is reset by the termination of the input tone signal.

Thus, it is apparent that because tuned frequency device 3 is not allowed to buildup, rapid turn off of the frequency detector system is provided and the system is thereby immediately readied for unambiguous detection of another tone signal burst.

While the invention has been particularly shown and described with reference to a preferred embodiment thereof, it will be understood by those skilled in the art that various changes in form and details may be made therein without departing from the spirit and scope of the invention.

We claim:

1. A frequency detection circuit employing a tuned frequency device, said tuned frequency device having an input and an output and tuned to the frequency of the input signal to be detected including:

means coupled to said input and operable selectively for attenuating said signal to be detected;

pulse producing means having an input and an output with last said input coupled to the output of said tuned frequency device to provide an output pulse when the resonant buildup of said tuned frequency device exceeds a predetermined level; and feedback control means coupling said output pulse from said pulse producing means to said selectively operable attenuating means to cause last said means to attenuate said input signal and to thereby initiate decay of said resonant buildup.

2. The circuit as set forth in claim 1 wherein said means coupled to said input is an FET device.

3. The circuit as set forth in claim 1 wherein said tuned frequency device comprises a tuning fork having a piezoelectric driving crystal in contact with one of the prongs of said tuning fork and a piezoelectric pickup crystal in contact with the other.

4. The circuit as set forth in claim 1 wherein flip-flop means, coupled to the output of said pulse producing means, is set in response to said output pulse from said pulse producing means and is reset in response to said input signal to be detected.

5. A frequency detection circuit employing a tuned frequency device, said tuned frequency device having an input terminal and an output terminal and tuned to the frequency of the input signal to be detected including:

variable impedance means coupled in series with said input terminal for attenuating said signal to be detected in accordance with the magnitude of said impedance;

pulse producing means having an input terminal and an output terminal with said input terminal coupled to the output terminal of said tuned frequency device to provide an output pulse on said output terminal when the resonant buildup of said tuned frequency device exceeds a predetermined level; and feedback control circuit means coupling said output pulse from said pulse producing means to said variable impedance means to cause said variable impedance means to increase in impedance in response to said pulse to attenuate said input signal and to thereby initiate decay of said resonant buildup.

6. The circuit in accordance with claim 5 wherein said variable impedance is an FET device having a source, drain and control electrode with the path between said source and drain electrodes connected in series with said tuned frequency device input terminal and said control electrode coupled to said feedback control circuit means.

7. The circuit in accordance with claim 5 wherein said tuned frequency device comprises a tuning fork having a piezoelectric driving crystal in contact with one of the prongs of said tuning fork and a piezoelectric pickup crystal in contact with the other.

8. The circuit in accordance with claim 5 wherein said pulse producing means includes flip-flop means and said feedback control circuit means is coupled to the output of said flip-flop means.

9. A frequency detection system for detecting the frequency of tone signal bursts to provide an output pulse in dependence upon the frequency of said tone signal bursts comprising:

tuned frequency means having input means and output means coupled thereto and which is selectively responsive to tone signal bursts of frequency corresponding to the tuned frequency to produce resonant buildup to be coupled to said output means;

variable impedance means coupled in series with the input means of said tuned frequency means;

pulse producing means coupled to the output means of said tuned frequency means to produce an output pulse in response to said resonant buildup; and feedback means coupling said output pulse to said variable impedance means to increase the impedance of said variable impedance means in response to said pulse.

10. A frequency detection circuit having a tuned frequency device with an input terminal and an output terminal and which is tuned to detect a tone signal having a frequency corresponding to the tuned frequency of said tuned frequency device; including:

pulse producing means having an input terminal and an output terminal with the input terminal coupled to the output terminal of said tuned frequency device so that said pulse producing means produces output pulses on said output terminal in response to detection of a tone signal by said tuned frequency device;

controlled damping means having a damping path coupled in series with the input terminal of said tuned frequency device and having control terminal means for controlling the magnitude of damping effected by said damping path; and feedback circuit means coupled between the output terminal of said pulse producing means and the control terminal means of said controlled damping means to control the impedance of said damping path in response to said output pulses to thereby limit the buildup in said tuned frequency device.

11. The circuit as set forth in claim 10 wherein said controlled damping means is an FET device.

12. The circuit as set forth in claim 10 wherein said tuned frequency device comprises a mechanically resonant tuning fork having a piezoelectric driving crystal in contact with one of the prongs of said tuning fork and a piezoelectric pickup crystal in contact with the other.

13. The circuit as set forth in claim 10 wherein flip-flop means, coupled to the output terminal of said pulse producing means, are set in response to an output on said output terminal and are reset by the termination of said tone signal.

14. The detection circuit as set forth in claim 10 wherein said controlled damping means is an FET device and said tuned frequency device includes a mechanically resonant type structure.

15. The circuit as set forth in claim 14 wherein said pulse producing means includes flip-flop means and said feedback circuit means is coupled to the output of said flip-flop means.

16. A frequency detection system for detecting tone signal bursts of selected frequency comprising:

controlled impedance means having input terminal means for receiving said tone signal bursts, output terminal means, and a control terminal means effective to vary the impedance between the input terminal means and the output terminal means as a function of the voltage applied thereto;

tuned frequency means having input circuit means and output circuit means with said input circuit means coupled to the output terminal means of said controlled impedance means;

pulse producing means having input circuit means and output circuit means with said input circuit means coupled to the output circuit means of said tuned frequency means so that said pulse producing means produces output pulses on said output circuit means in response to detection of said tone signal bursts; and feedback circuit means coupled between the output circuit means of said pulse producing means and the control terminal means of said controlled impedance means to increase the impedance between the input terminal means and the output terminal means of said controlled impedance means in response to the voltage level change caused by said output pulses to thereby initiate a decay of the buildup in said tuned frequency means.

17. The frequency detection system as set forth in claim 16 wherein flip-flop means, coupled to the output circuit means of said pulse producing means and to the input terminal means of said controlled impedance means, are set in response to said voltage level change and are reset by the termination of said tone signal bursts.

18. A frequency detection circuit for detecting the frequency of tone signals comprising:

tuned frequency means having input circuit means and output circuit means and responsive to tone signals having a frequency corresponding to the tuned frequency to thereby produce a resonant voltage buildup on said output circuit means;

voltage variable impedance means having its variable impedance path coupled in series with the input circuit means of said tuned circuit means to attenuate said tone signals and effect a voltage decay of said voltage buildup;

pulse producing means having an input circuit means coupled to receive the output of the output circuit means of said tuned frequency means, and an output circuit means, said pulse producing means having a characteristic such that it initiates a pulse in response to a first level in said voltage buildup received on said input circuit means and terminates said pulse in response to a second level in said voltage decay received on said input circuit means; and feedback circuit means coupled between the output circuit means of said pulse producing means and said voltage variable impedance means to cause said voltage variable impedance means to effect attenuation of said tone signals and said voltage buildup in response to the initiation of said pulse, said attenuation thus initiating said decay to said second level whereupon termination of said pulse is effected and said buildup again begins thereby maintaining voltage buildup between said first and second voltage levels.

19. A frequency detection system for detecting the frequency of tone signal bursts comprising:

tuned frequency means having an input circuit means and an output circuit means and responding to tone signal bursts of a frequency corresponding to the tuned frequency to produce voltage buildup, which is coupled to said output circuit means;

controlled impedance means having a controlled impedance path coupled in series with the input means of said tuned frequency means to attenuate said tone signal bursts in response to a control voltage;

level detection means having an input circuit means and an output circuit means with said input circuit means coupled to receive said voltage buildup on the output circuit means of said tuned frequency means;

filtering means coupled to the output circuit means of said level detection means;

amplifying means coupled to said filtering means to produce an output pulse when said voltage buildup exceeds the threshold level of said level detection means;

flip-flop means coupled to be set in response to the output pulse from said amplifying means;

feedback circuit means causing said output pulse from said amplifying means to control said controlled impedance path to attenuate said tone signal; and rectifying means and inverter amplifying means coupled to reset said flip-flop means in response to the termination of said tone signal bursts whereby said flip-flop is set in response to said voltage buildup reaching said detection level and reset upon termination of said tone signal bursts.